(12) United States Patent
Satyanarayanan et al.

(10) Patent No.: US 11,016,933 B2
(45) Date of Patent: *May 25, 2021

(54) HANDLING WEAKENING OF HASH FUNCTIONS BY USING EPOCHS

(71) Applicant: EMC IP Holding Company LLC, Hopkinton, MA (US)

(72) Inventors: Mahadev Satyanarayanan, Pittsburgh, PA (US); Niraj Tolia, Sunnyvale, CA (US); Andrew Gaul, San Francisco, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 192 days.

This patent is subject to a terminal disclaimer.

(21) Appl. No.: 16/269,825

(22) Filed: Feb. 7, 2019

(65) Prior Publication Data

US 2019/0188183 A1 Jun. 20, 2019

Related U.S. Application Data

(63) Continuation of application No. 14/829,478, filed on Aug. 18, 2015, now Pat. No. 10,242,015.

(51) Int. Cl.
| | |
|---|---|
| *G06F 16/00* | (2019.01) |
| *G06F 16/13* | (2019.01) |
| *G06F 16/182* | (2019.01) |
| *G06F 16/22* | (2019.01) |
| *G06F 16/174* | (2019.01) |

(52) U.S. Cl.
CPC ........ *G06F 16/137* (2019.01); *G06F 16/1748* (2019.01); *G06F 16/1824* (2019.01); *G06F 16/2255* (2019.01)

(58) Field of Classification Search
CPC ............... G06F 16/137; G06F 16/1748; G06F 16/1824; G06F 16/2255
See application file for complete search history.

(56) References Cited

U.S. PATENT DOCUMENTS

| | | | |
|---|---|---|---|
| 6,173,313 B1 * | 1/2001 | Klots | G06F 9/465 707/999.1 |
| 8,930,648 B1 | 1/2015 | Storer | |
| 2007/0266037 A1 | 11/2007 | Terry | |
| 2010/0235525 A1 | 9/2010 | McGuire | |
| 2014/0143206 A1 * | 5/2014 | Pittelko | G06F 16/137 707/634 |
| 2014/0281307 A1 * | 9/2014 | Peterson | G06F 3/0688 711/162 |
| 2015/0213049 A1 * | 7/2015 | Kleiman | G06F 16/1752 707/692 |
| 2016/0188589 A1 * | 6/2016 | Guilford | H03M 7/3091 707/692 |

* cited by examiner

*Primary Examiner* — Alexander Khong
(74) *Attorney, Agent, or Firm* — Krishnendu Gupta; Nikhil Patel (57) ABSTRACT

Techniques to manage the use of hash functions are disclosed. In various embodiments, a hash function epoch metadata is stored to associate a hash function with an epoch, the epoch defining a subset of data stored by a distributed file system. The distributed file system is configured to use the hash function epoch metadata to manage storage of data comprising the subset of data stored by the distributed file system.

21 Claims, 10 Drawing Sheets

| epoch | chunk id | valid hash functions |
|---|---|---|
| e0 | id | 1 0 0 0 0 0 0 0 |
| e1 | id+x | 1 1 0 0 0 0 0 0 |
| e2 | id+y | 0 1 0 0 0 0 0 0 |
| ⋮ | | ⋮ |
| en | id+z | 0 0 1 1 0 0 0 0 |

| epoch | valid hash functions |
|---|---|
| e0 | 1 0 0 0 0 0 0 0 |
| e1 | 1 1 0 0 0 0 0 0 |
| e2 | 0 1 0 0 0 0 0 0 |
| ⋮ | ⋮ |
| en | 0 0 1 1 0 0 0 0 |

| epoch | chunk id | valid hash functions |
|---|---|---|
| e0 | id | 1 0 0 0 0 0 0 0 |
| e1 | id+x | 1 1 0 0 0 0 0 0 |
| e2 | id+y | 0 1 0 0 0 0 0 0 |
| ⋮ | | ⋮ |
| en | id+z | 0 0 1 1 0 0 0 0 |

HANDLING WEAKENING OF HASH FUNCTIONS BY USING EPOCHS

CROSS REFERENCE TO OTHER APPLICATIONS

This application is a continuation of co-pending U.S. patent application Ser. No. 14/829,478, entitled HANDLING WEAKENING OF HASH FUNCTIONS BY USING EPOCHS filed Aug. 18, 2015 which is incorporated herein by reference for all purposes.

BACKGROUND OF THE INVENTION

Over time, hash functions once considered to be adequately secure and/or collision resistant may come to be considered to have been "weakened". For example, a hash function may be considered to be less secure than once thought if researchers or actual attackers have found ways to determine the input that was provided to the function to generate a given output, and/or if it is found that for two different inputs the hash function may sometimes produce the same output.

Specifically, the SHA-1 and MD5 hash functions once were considered to be secure (i.e., hard to invert) and (for practical purposes) collision free, but at least for certain applications they are considered to be weakened.

Hash functions have been used to store data one a de-duplicated basis. Data to be stored, e.g., a file or other object, may be broken into a plurality of "chunks" and a hash function may be used to determining for each chunk a corresponding hash value. An index or other data structure may be checked to determine if the hash value is already present, indicating the same data has already been stored. If so, a reference to the data as previously stored may be provided, instead of storing the same data again.

Data may be stored over a long period of time, e.g., a number of years. Over time, a hash function used to manage the storage of data, e.g., to perform de-duplication, may need to be replaced with a newer, more robust hash function.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Epoch-based management of transitions from weakened to stronger hash functions over time in the context of a distributed file system and/or other de-duplicating data storage and/or management system is disclosed. In various embodiments, introduction of a new hash function marks the end of one hash function epoch and the start of a new epoch. Hash function epoch metadata is stored to reflect each such transition and for each epoch one or more hash function that were and/or remain valid and/or in use during that epoch. In some embodiments, multiple hash functions may be valid for a given epoch. In some embodiments, data (e.g., chunks) stored using an older hash function that has been and/or is in the processing of being replaced by a newer one may be migrated through background processing to being represented in the system using the newer hash function. Associated hash function epoch metadata may be updated once such a migration has been completed. In some embodiments, client systems may during a transition period be configured to compute hash values using two or more hash functions.

Figure 1:
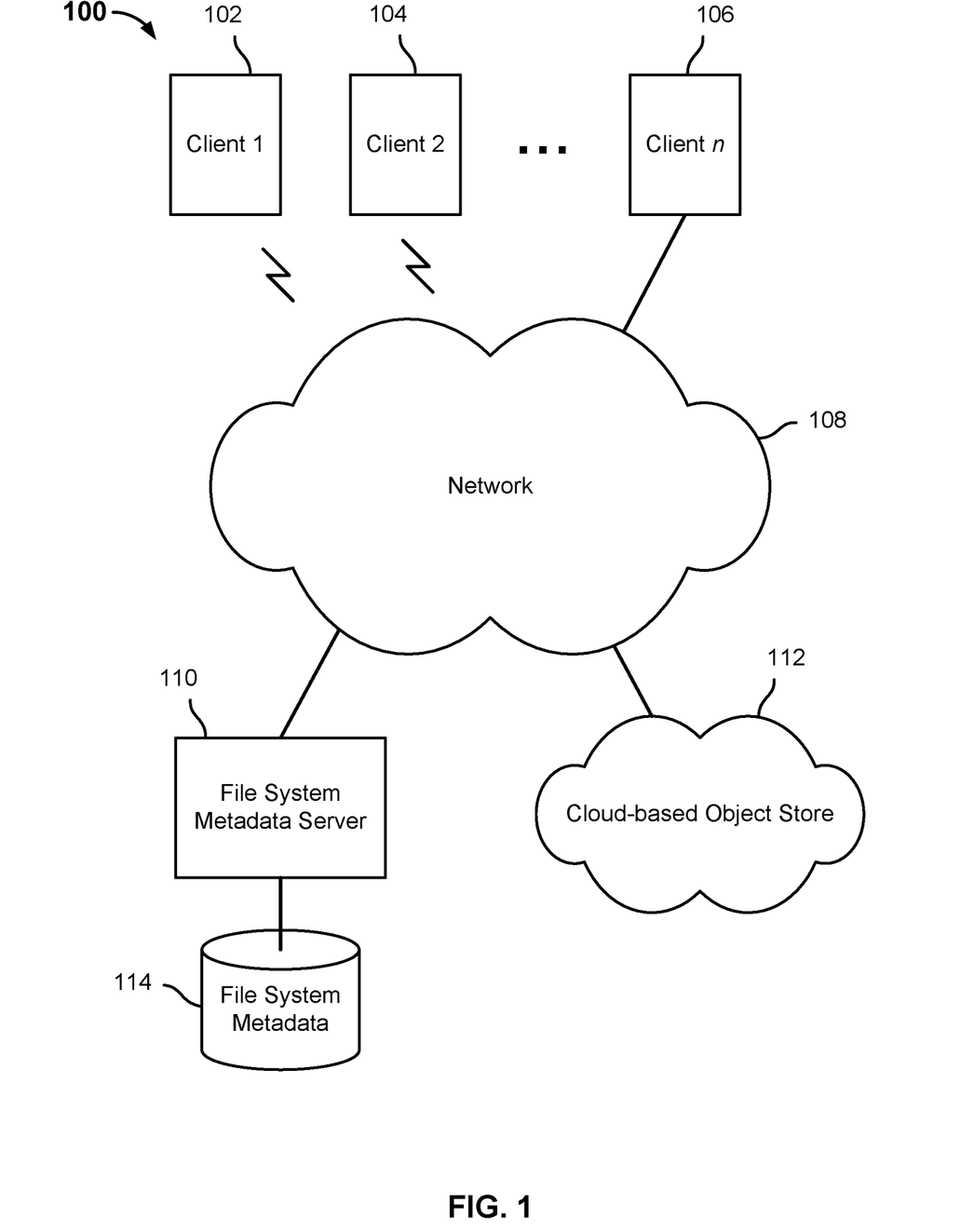
FIG. 1 is a block diagram illustrating an embodiment of a distributed file system and environment.

FIG. 1 is a block diagram illustrating an embodiment of a distributed file system and environment. In the example shown, the distributed file system environment 100 includes a plurality of client systems and/or devices, represented in FIG. 1 by clients 102, 104, and 106. In the example shown, the clients connect (wireless or otherwise) to a network 108, e.g., one or more of a local area network (LAN), a wide area network (WAN), the Internet, and/or one or more other public and/or private networks. The clients have access via network 108 to a file system metadata server 110. Applications on the respective clients, such as clients 102, 104, and 106, make file system calls, which result in various embodiments in corresponding remote calls being made to file system metadata server 110. For example, a file system client, agent, or other entity on the client may intercept or otherwise receive calls by the application to a local (e.g., native) file system, and may redirect such calls to an agent configured to make corresponding remote calls to file system metadata server 110 (e.g., transparently to the application).

In the example shown, data comprising objects stored in the file system, such as files, is stored in a cloud-based object store 112. In some embodiments, files may be segmented into a plurality of segments or "chunks", each of which is stored in a corresponding location in the cloud-based object store. File system calls are made to file system metadata server 110, which stores file system metadata in a file system metadata storage 114, e.g., in a database or other data store. File system metadata server 110 may store in file system metadata store 114, for example, a segment or "chunk" map for each file or other object stored and represented in the file system. For example, for each file name (e.g., pathname) the file system metadata server 110 may store in a corresponding segment map a hash or other representation of each segment, and for each a corresponding location in which the segment is (or is to be) stored in cloud-based object store 112. Other file system metadata, such as metadata typically stored by a file system, may be stored by file system metadata server 110 in file system metadata store 114. Examples include, without limitation, a directory, file, or other node/object name; an identification of parent and/or child nodes; a creation time; a user that created and/or owns the object; a time last modified and/or other time; an end-of-file (EOF) or other value indicative of object size; security attributes such as a classification, access control list, etc.; and/or other file system metadata.

While in the example shown in FIG. 1 the file system metadata server 110 and the cloud-based object store 112 are shown as separate systems, located in different networks and/or physical locations, in other embodiments the file system metadata and file system content data may be stored together, e.g., both on cloud-based resources and/or both on enterprise or other network servers, etc.

Figure 2:
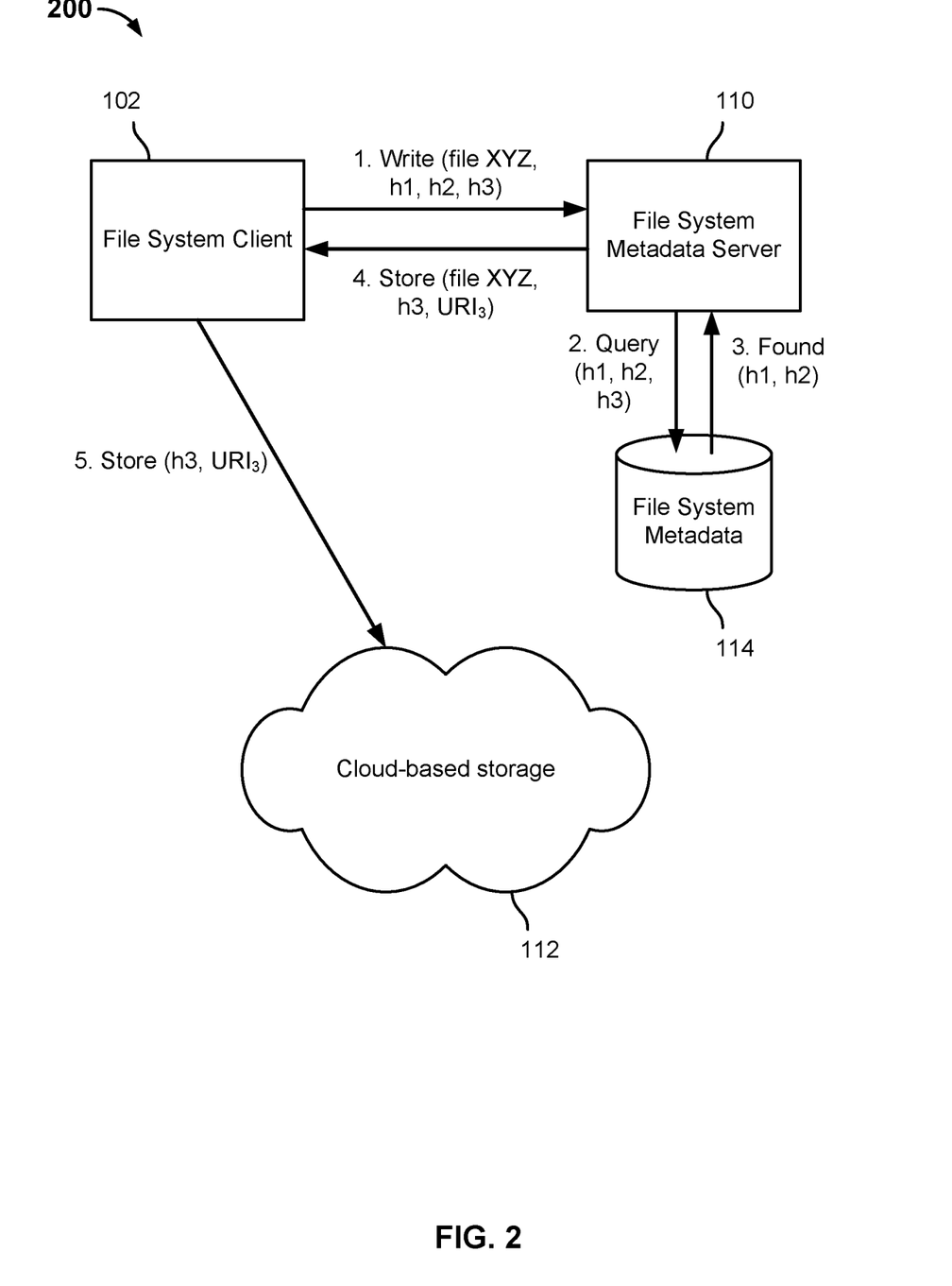
FIG. 2 is a block diagram illustrating an example of a write operation in an embodiment of a de-duplicating distributed file system.

FIG. 2 is a block diagram illustrating an example of a write operation in an embodiment of a de-duplicating distributed file system. In the example shown, file system client 102 sends a write request (1) to file system metadata server 110. The request includes a filename of a file to be written ("XYZ") and in this example three hash values, each computed by file system client 102 using a prescribed hash function based on a corresponding chunk into which the file XYZ had been divided. The file system metadata server 110 queries (2) a set of file system metadata 114 to determine whether chunks of data associated with the same hash values have been stored previously. For example, a database query may be formed and executed. In this example, a query response (3) indicates that the first two hash values included in the write request (1) were found in file system metadata 114, indicating they had been stored previously. In some embodiments, in such a case a reference to the chunks as stored previously may be associated with the corresponding portions of the file being written to, file XYZ in this example. The file system metadata server 110 returns to the file system client 102 a response (4) to the write request (1) indicating the file segment/chunk that needs to be stored, in this example the chunk corresponding to hash h3, and a URI or other location to be used to store the chunk in the cloud-based storage 112. The file system client 102 uses the received URI to store the one chunk (in this example) that had not been stored previously (5).

Figure 3:
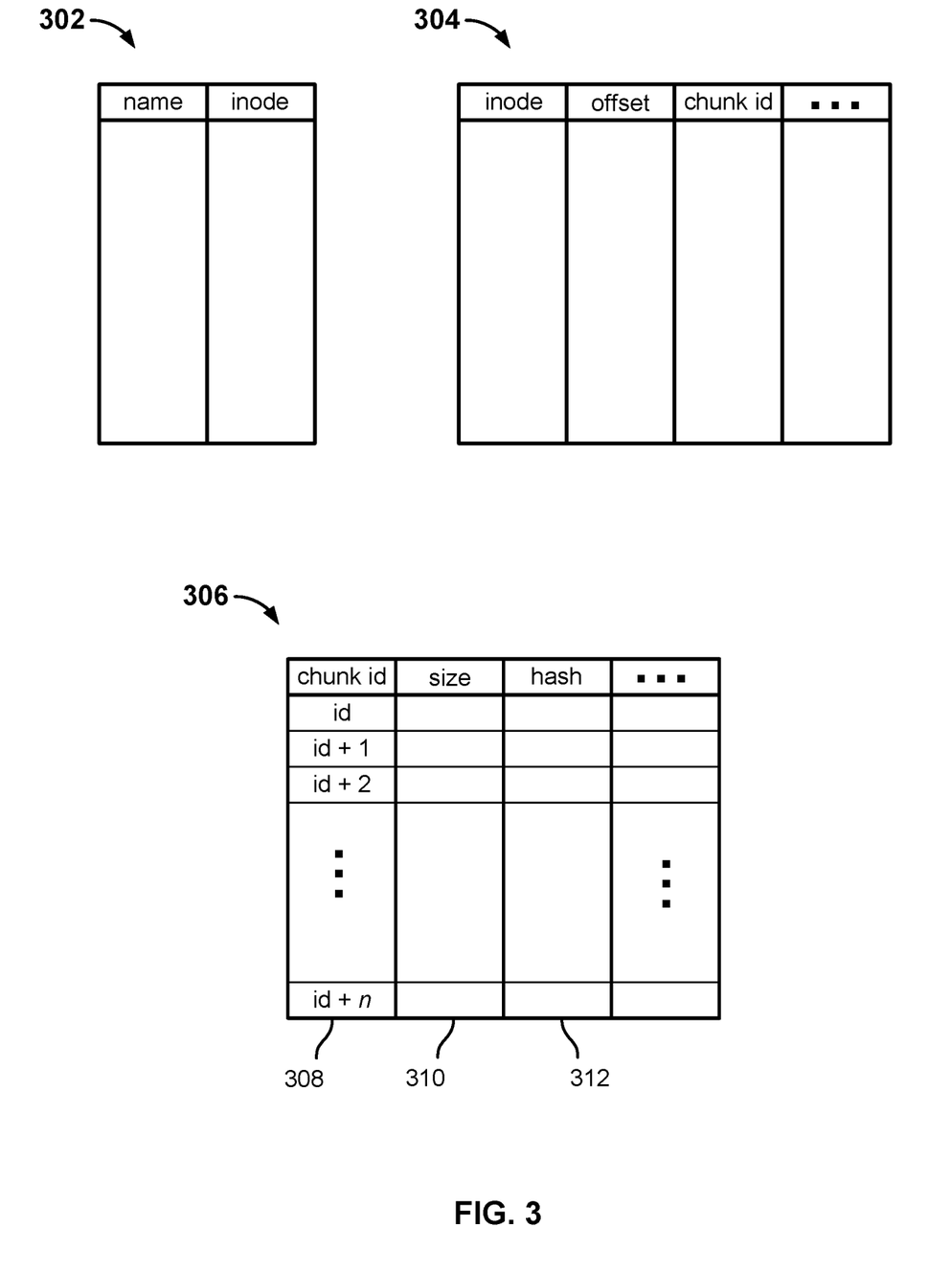
FIG. 3 is a block diagram illustrating an example set of file system metadata tables used in an embodiment of a distributed file system.

FIG. 3 is a block diagram illustrating an example set of file system metadata tables used in an embodiment of a distributed file system. In various embodiments, the tables 302, 304, and 306 of FIG. 3 may be created and maintained by a file system metadata server, such as file system metadata server 110 of FIG. 1. Referring to the example shown in FIG. 2, the tables 302, 304, and 306 of FIG. 3 may be included in file system metadata 114. In the example shown, an inode table 302 is used to store data associating each named file system object, e.g., directories, files, or other objects, with a corresponding inode or other unique number or identifier. Chunk map table 304 is used in various embodiments to store for each file, and for each of one or more segments (chunks) into which that file has been broken up to be stored, an offset of the chunk within the file, a chunk identifier (chunk id), and other metadata. For example, a file that has been stored as three chunks would have three entries (rows) in table 304, one for each chunk.

In various embodiments, the chunk id is a monotonically increasing value, with each successively processed chunk being given a next chunk id in numeric order. In various embodiments, chunks are immutable once stored. If file data is modified, affected data is stored as a new chunk and assigned a next chunk id in order. As a result, a chunk with a higher chunk id by definition was processed subsequent to a chunk with a lower chunk id, and it can be assumed neither was modified since it was created and stored.

Finally, the chunk metadata table 306 includes a row for each chunk, identified by chunk id (column 308 in the example shown), and for each chunk metadata indicating the size of the chunk (column 310), a hash value computed based on at least a portion of the chunk data using a hash function (column 312), and other metadata.

Figure 4:
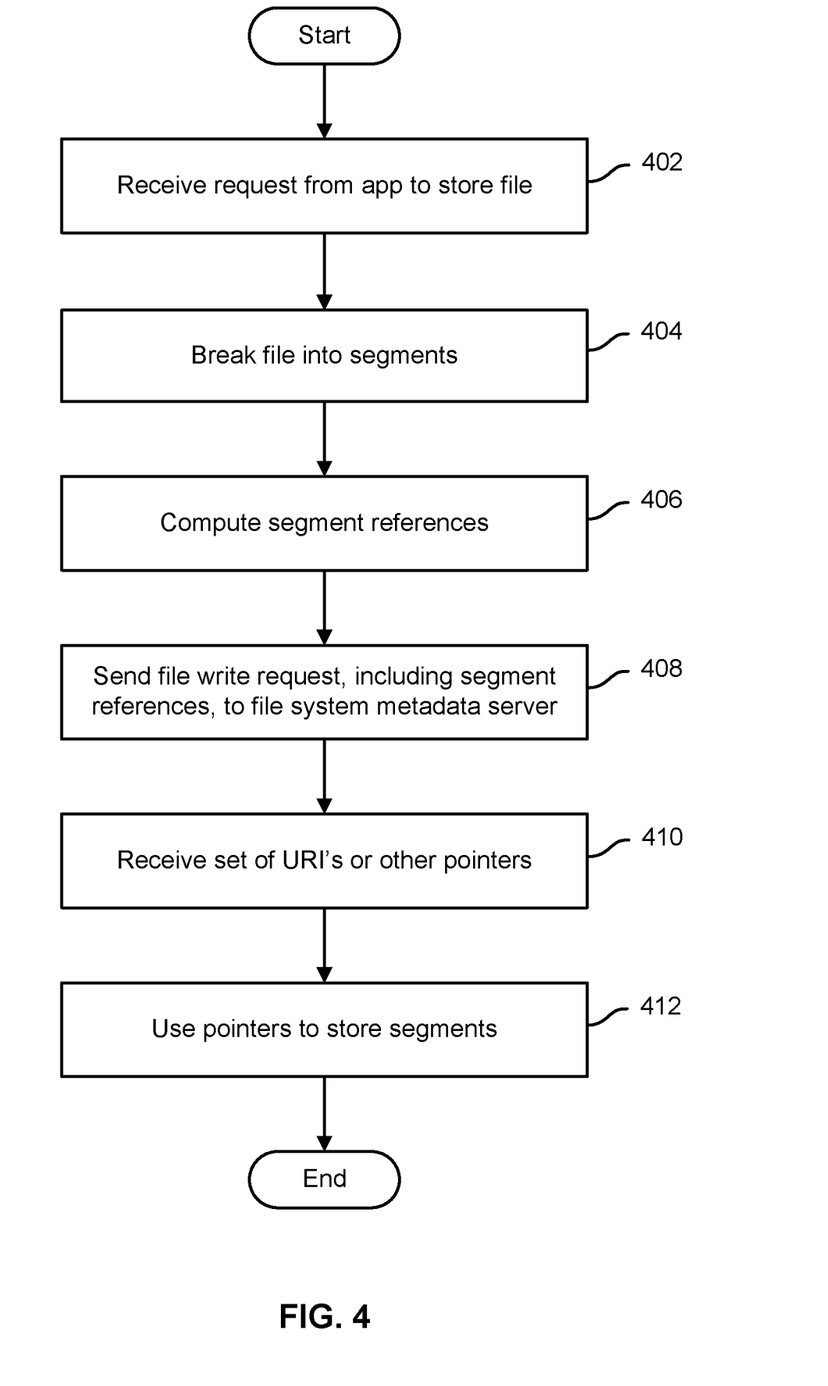
FIG. 4 is a flow chart illustrating an embodiment of a process to store a file or other file system object in a distributed file system.

FIG. 4 is a flow chart illustrating an embodiment of a process to store a file or other file system object in a distributed file system. In various embodiments, the process of FIG. 4 may be performed on a client system or device, e.g., by a file system client or other agent running on the client system/device, such as file system client 208 of FIG. 2. In the example shown, a request is received, e.g., from an application, to store a file (402). The file is segmented into one or more segments (404). For each segment, a segment reference, e.g., a hash, is computed (406). A file write request that includes the segment references is sent to the file system metadata server (408). A set of uniform resource indicators (URI's) or other pointers is received from the file system metadata server (410). In various embodiments, the set of pointers may include pointers only for those segments not already stored by the distributed file system. The received pointers are used to store segments, e.g., via HTTP "PUT" requests sent directly to the cloud-based object store (412).

Figure 5:
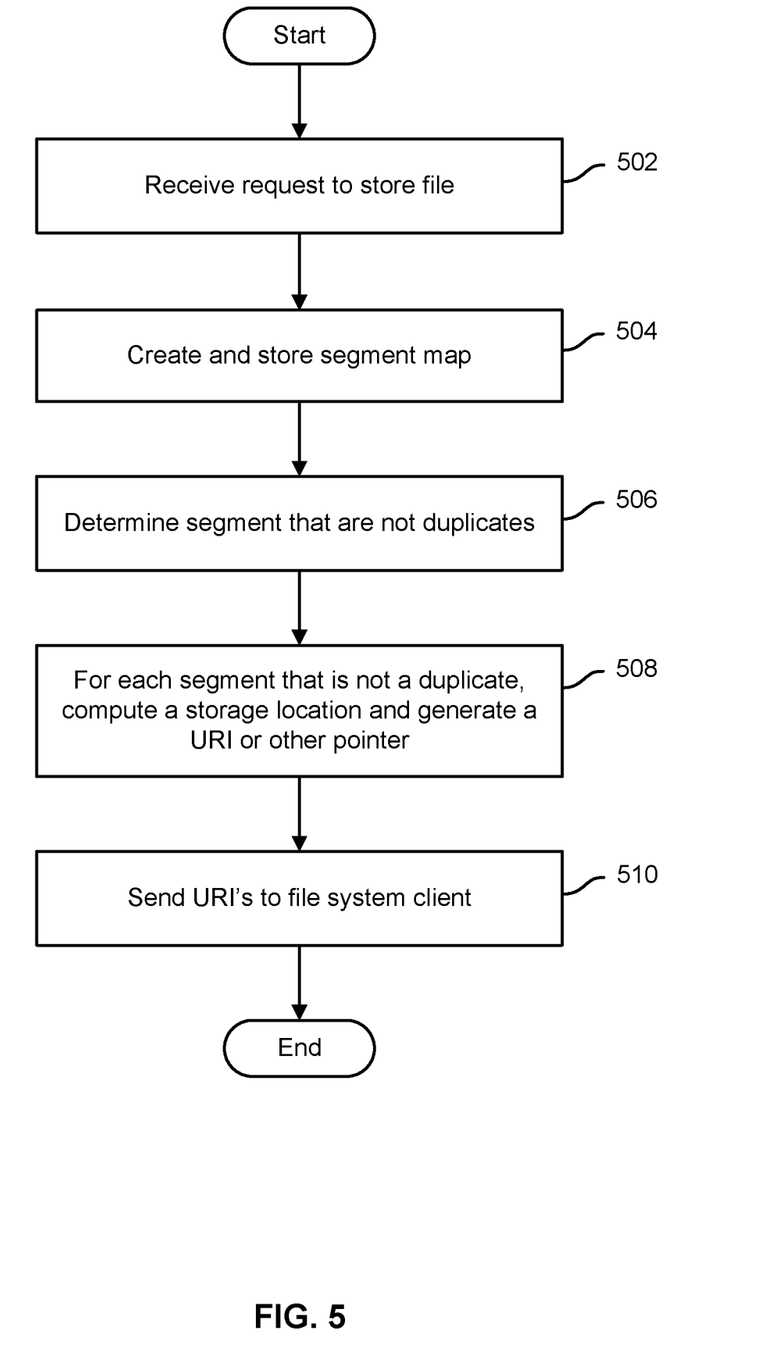
FIG. 5 is a flow chart illustrating an embodiment of a process to handle a request to store a file or other file system object in a distributed file system.

FIG. 5 is a flow chart illustrating an embodiment of a process to handle a request to store a file or other file system object in a distributed file system. In various embodiments, the process of FIG. 5 may be performed by a file system metadata server, such as file system metadata server 110 of FIG. 1. In the example shown, a request to store a file is received (502). A segment ("chunk") map that associates the file system object name and/or other identifier (e.g., file name, pathname) with a set of one or more segment references (e.g., hash values) is created (504). Segments that are not duplicates of segments already stored by the distributed file system are identified, for example based on the segment references (506). For each segment that is not a duplicate, a storage location is computed (e.g., based at least in part on all or part of the segment reference) and a URI or other pointer usable to store the segment directly in the cloud-based data store is generated (508). In various embodiments, the URI or other pointer is signed cryptographically by the file system metadata server. The URI may have an expiration time by which it must be used to store the segment. The URI's are sent to the file system client from which the request to store the file was received (510).

As noted above, a hash function may come to be considered to have been weakened or become less reliable, resulting in a desire to transition to use of a newer, more robust hash function. For example, over time older hash functions such as SHA-0 and MD5 have come to be replaced by stronger hash functions, such as SHA-1 and more recently SHA-256. Each hash function has its own algorithm and associated attributes. For example, the MD5 hash function produces an output value comprising 16 bytes, whereas SHA-1 and SHA-256 generate values that are 20 bytes and 32 bytes in size, respectively.

One possible approach to managing transitions to new hash functions over time would be to update data structures of a distributed file system or other data management system to store the new hash values in an additional column added to a metadata table or other data structure. For example, if originally hash values generated using the SHA-1 hash function were stored in column 312 of table 306 of FIG. 3, an additional column may be added to the table 306 to store hash values computed using the SHA-256 function. Alternatively, the hash value column 312 maybe sized (or resized) to accommodate hash values computed using either function, and separate metadata and/or attributes of the hash values themselves (e.g., length) may be used to determine for a given hash value which hash function was used.

File system clients may need to be updated and/or configured to use the newer hash function. It may not be practical or desirable to track down and update each and every file system client to configure each client to use a new hash function. Even in such an approach, there would be a need to detect file system clients that had not been updated. At least during periods of transition, some file system clients may be configured to continue to use the older hash function even while others have begun to use a newer one. A file system client may be capable of using two or more different hash functions and may need a way to determine which one (or more) to use for a given operation and context (e.g., file system metadata server instance, etc.)

Figure 6A:
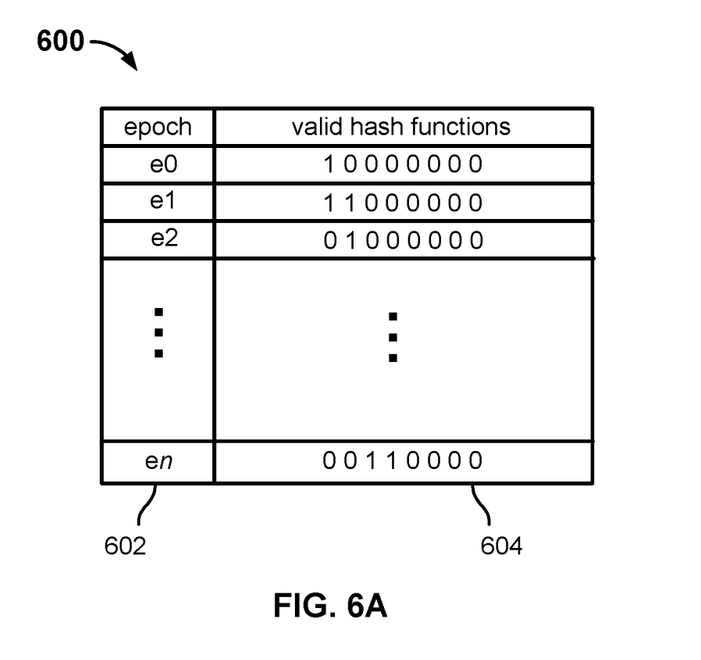
FIG. 6A is a block diagram illustrating an example of a hash function epoch table in an embodiment of a data management system.

FIG. 6A is a block diagram illustrating an example of a hash function epoch table in an embodiment of a data management system. In the example shown, hash function epoch table 600 includes a first column 602 in which an epoch number or other identifier is stored and a second column 604 in which for each epoch (row) data indicating one or more hash functions in use and/or otherwise associated with that epoch is stored. In the example shown, an 8-bit bitmask is stored for each epoch. Each bit represents a different hash function. For example, the first four bits may correspond to the SHA-0, MD5, SHA-1, and SHA-256 hash functions, respectively. A "1" for a given location in the 8-bit bitmask value indicates the corresponding function is/remains valid for chunks associated with (e.g., stored during) that epoch. In the example shown, for example, the value 10000000 stored for epoch e0 may indicated that only the SHA-0 hash function was used during that epoch. For epoch e1, for the first and second bits have been set to "1", indicating in some embodiments an overlap/transition period in which both the SHA-0 and MD5 hash functions may have been used, before the SHA-0 function was fully phased out in favor of using just the MD5 hash function, as indicating the row corresponding to epoch "e2". Finally, for a most recent (i.e., current) epoch en, a value "00110000" is stored, indicating in this example that in the current hash function epoch either the SHA-1 or SHA-256 hash function may be used.

In various embodiments, a file system client and/or server may perform a lookup in an hash function epoch table such as table 600 to determine which hash function to be used to compute hash values to represent the chunks into which a file or other object has been divided. For example, a file system client, such as file system client 102 in the example shown in FIGS. 1 and 2, may be configured to ping the file system metadata server, such as file system metadata server 110 of FIGS. 1 and 2, to determine which hash function to use. The file system metadata server may read a table such as table 600 to determine which hash functions are currently in use.

While in the example shown in FIG. 6A a bitmask is used to indicate which hash functions are valid for a given epoch, in some embodiments a single value indicating a single valid hash function may be stored for each epoch. In addition, while in the example shown in FIG. 6A an 8-bit bitmask is stored for each epoch, in various embodiments, values comprising more or fewer bits may be used. In some embodiments, a variable length bitmask, e.g., one that grows longer over time, as additional new valid hash functions are introduced, may be used. In some embodiments, a simple list of integers may be used.

Figure 6B:
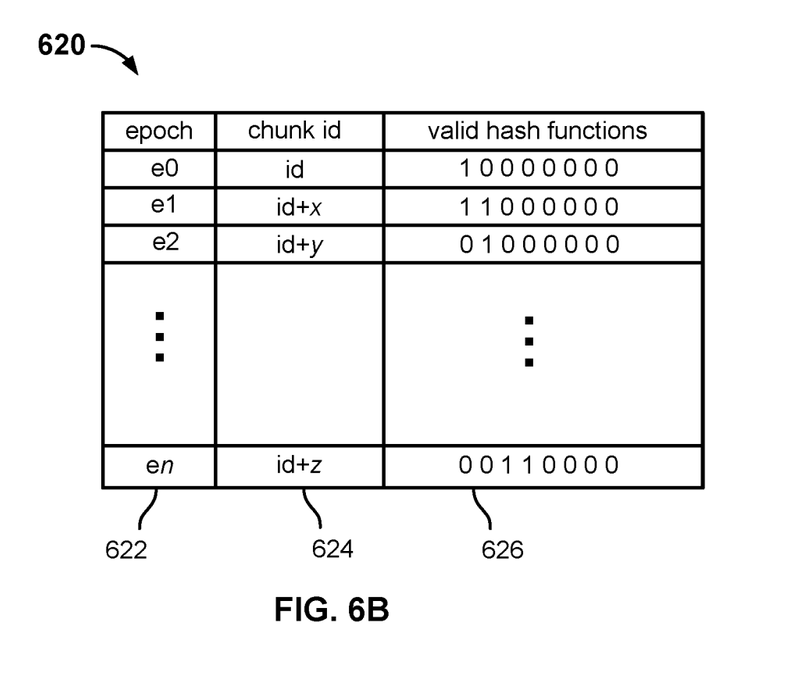
FIG. 6B is a block diagram illustrating an example of a hash function epoch table in an embodiment of a data management system.

FIG. 6B is a block diagram illustrating an example of a hash function epoch table in an embodiment of a data management system. In the example shown, the hash function epoch table 620 includes for each epoch (row) identified in an epoch identifier column 622 a chunk identifier (column 624) that defines a beginning (or end, in some embodiments) of the epoch and (as in table 600) an 8-bit value indicating which hash functions are associated with that epoch.

In various embodiments, the chunk id is a monotonically increasing value, with each successively stored chunk being given a next chunk id in alphanumeric order. In various embodiments, chunks are immutable once stored. If file data is modified, affected data is stored as a new chunk and assigned a next chunk id in order. Therefore, in such embodiments, a chunk having an identifier that is lower than the chunk identifier associated with the start of a hash function epoch and/or higher than a chunk identifier associated with the end of the epoch can be determined to not have been stored during that epoch. If the chunk identifier associated with the start of an epoch is stored in the table 620, for example, then for any given chunk identifier it should be possible to determine the hash function epoch during which the chunk was stored. The corresponding row of table 620 could then be read to determine the hash function(s) associated with that epoch.

Figure 7:
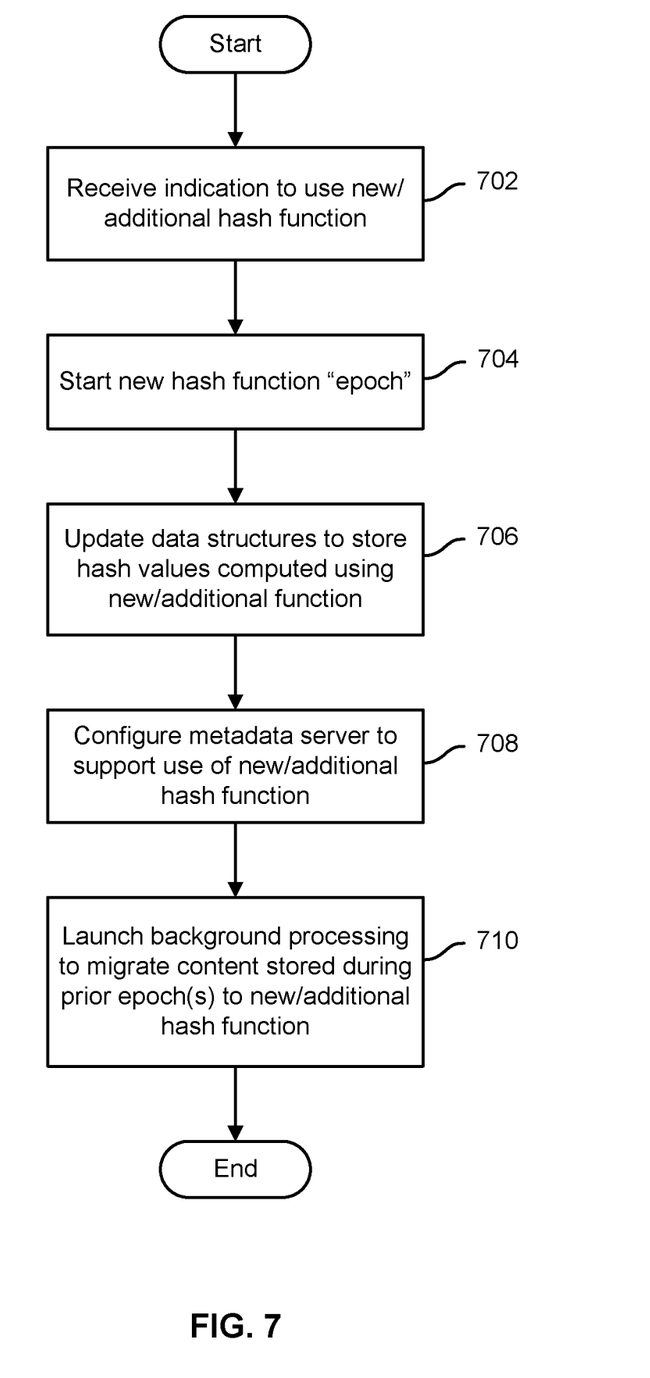
FIG. 7 is a flow chart illustrating an embodiment of a process to manage a transition to a new hash function.

FIG. 7 is a flow chart illustrating an embodiment of a process to manage a transition to a new hash function. In various embodiments, the process of FIG. 7 may be implemented by a file system metadata server, such as file system metadata server 110 of FIG. 1. In the example shown, an indication to use a new/additional hash function is received (702). For example, an administrator may provide a new hash function and configure the distributed file system metadata server, e.g., via an administrative user interface, to use the new function instead of and/or in addition to one or more other hash functions. A new hash function epoch is started (704). For example, a new entry in a hash function epoch table, such as table 600 of FIG. 6A or table 620 of FIG. 6B, may be made. In various embodiments, the new entry may result in file system clients being prompted to use the new hash function to store data chunks in connection with write operations performed during the newly-initiated epoch. Data structures, e.g., metadata tables such as table 306 of FIG. 3, are updated to store hash values computed using the new/additional hash function (706). For example, a new column may be added to a metadata table, or an existing column may be redefined/resized as needed to accommodate hash values computed using the new/additional function.

The metadata server is configured to use/support the new hash function (708). For example, in some embodiments, the file system metadata server performs verification by reading chunks of data as stored in the cloud-based chunk data storage, computing the corresponding hash, and comparing the computed hash to the corresponding value as stored in the file system metadata. If the values match, the verification result is positive. The file system metadata server may also be configured to read data from the hash function epoch table or similar data structure and to use such information to determine which hash function(s) is/are valid for a given chunk or range of chunks. The file system metadata server may also be configured to negotiate with a file system client to determine a hash function that both the client and server are configured to support.

A background process is initiated, in this example, to migrate chunks stored in one or more prior epochs to be represented in the file system metadata by hash values computed using the new/additional hash function (710). In various embodiments, it may be considered advantageous to migrate chunks stored in a prior epoch to being represented by a hash value computed using a hash function associated with a current epoch. Such an approach may increase the likelihood of avoiding duplicate storage of the same data, since in order for a duplicate to be found, the hash value computed at the time of storage of the later-written chunk must be computed using the same hash function as was used to compute the hash value by which the earlier-stored copy of the same data (chunk) is represented in the system. In some embodiments, migration is optional and/or is not provided.

In some embodiments, hash function use migration may be performed lazily/opportunistically. For example, file system clients may be configured to compute and provide (e.g., in connection with write requests) hash values based on two or more functions, e.g., an old function and a new one. The file system metadata server may use the hash value computed using the old hash function to check for duplicates. If a duplicate is found, the hash value computed by the file system client using the new hash function and included in the request may be used by the file system metadata server to update the file system metadata, e.g., by replacing the old hash value with the new hash value to represent the data chunk in metadata, adding the new hash value in addition to the old hash value, etc.

Figure 8:
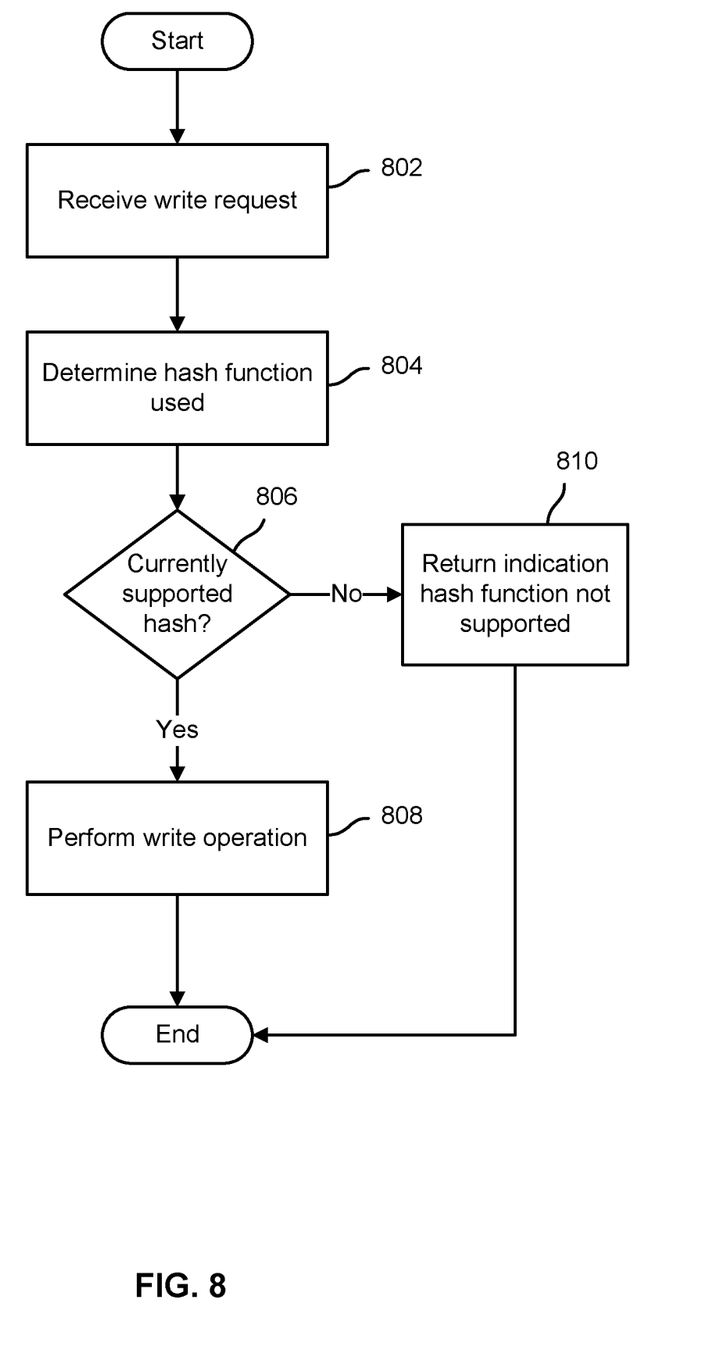
FIG. 8 is a flow chart illustrating an embodiment of a process to enforce use by file system clients of a currently-valid hash function.

FIG. 8 is a flow chart illustrating an embodiment of a process to enforce use by file system clients of a currently-valid hash function. In various embodiments, the process of FIG. 8 may be implemented by a file system metadata server. In the example shown, a write request is received (802). For example, a write request that includes a file name or other object identifier and for each of a plurality of chunks comprising the file a corresponding hash value, as in the example shown in FIG. 2, may be received. A hash function that was used to compute the received hash values is determined (804). In some embodiments, the hash function may be one that was negotiated with the file system client in connection with the write request (or otherwise). In some embodiments, the hash function may be inferred based on the size (i.e., number of bytes) and/or other attributes of the received hash values. In some embodiments, the file system client may include in the write request an explicit indication of the hash function that was used. In some embodiments, the request may include more than one hash value, and the respective hash function used to compute each one of them may be determined.

A determination is made as to whether the hash function that was used to compute the hash values that were received in connection with the write request is a currently supported hash function, i.e., is a hash function that is valid for the current epoch (806). If so, the write operation is performed (808) using the received hash values, in the manner as described above in connection with FIG. 2, for example. If the hash function that was used by the file system client is determined to be not currently supported (806), an indication is returned that the hash function used was not valid (810). In some embodiments, an indication of one or more hash functions that are currently valid may be included.

Figure 9:
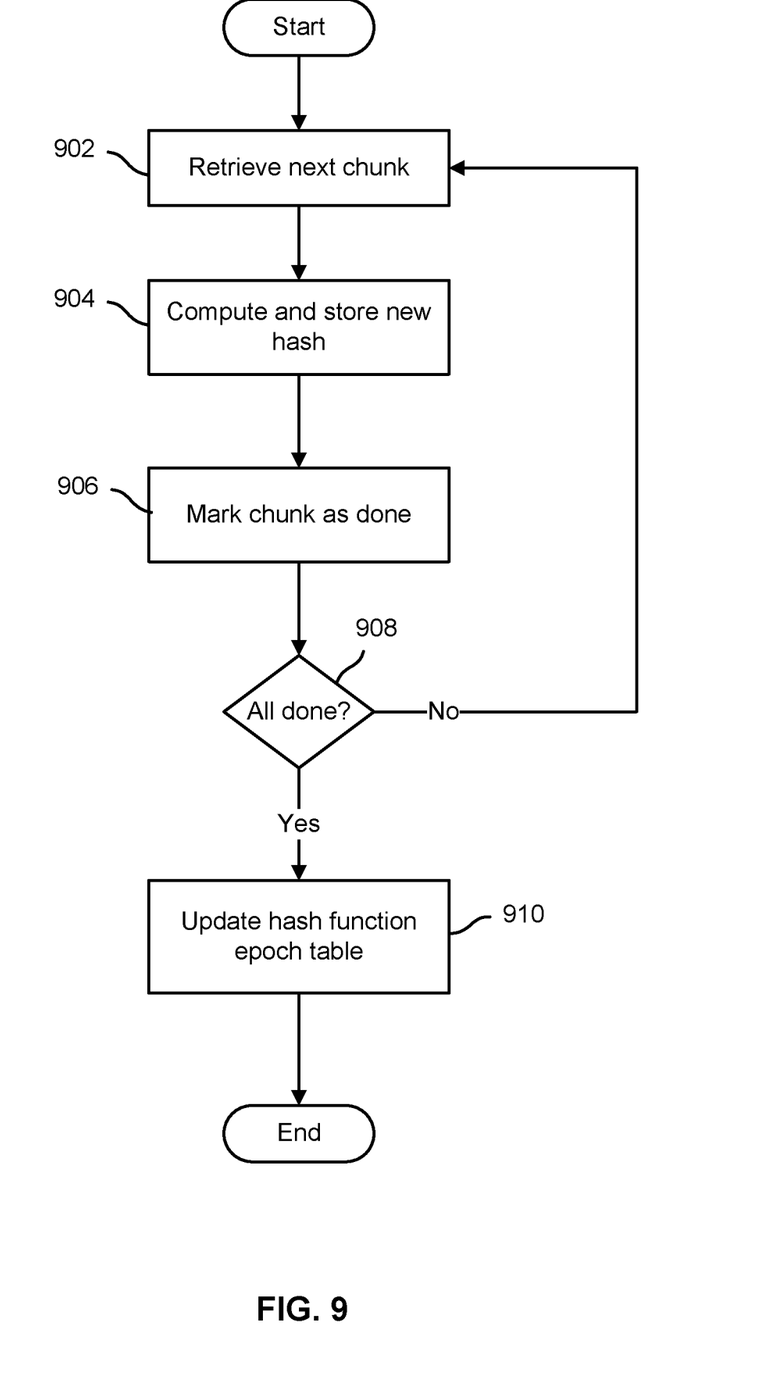
FIG. 9 is a flow chart illustrating an embodiment of a process to (optionally, in some embodiments) migrate chunks stored in a prior epoch to be represented by hash values computed using a new hash function.

FIG. 9 is a flow chart illustrating an embodiment of a process to (optionally, in some embodiments) migrate chunks stored in a prior epoch to be represented by hash values computed using a new hash function. In various embodiments, step 710 of FIG. 7 may be implemented using the process of FIG. 9. In the example shown, a next chunk to be migrated is retrieved (902), e.g., read from cloud-based storage. A hash value is computed using the new hash function and the new value is stored in place of (or in some embodiments alongside) the previously-stored hash value (904), e.g., in a chunk metadata table. The chunk is marked as having been migrated to the new representation (906). For example, a bitmask or other data structure may be used to track which chunks stored during the prior epoch have been migrated and which remain to be done. If more chunks remain to be migrated (908), a next chunk is retrieved (902) and the new hash is computed and stored (904) and the chunk marked as done (906). Processing continues until all chunks to be migrated have been migrated to being represented by hash values computed using the new hash function (908), at which time the hash function epoch table is updated (910), e.g., to reflect that the hash function that was used previously to compute hash values for chunks stored during the prior epoch is no longer associated with that epoch, and the new hash function is associated with the migrated epoch, after which the process ends.

In some embodiments, during a migration operation such as the one described above in connection with FIG. 9 the prior epoch involved in the migration operation may be marked as unavailable to perform deduplication. In some embodiments, the prior epoch may be marked as unavailable to be used for deduplication checks while the migration operation is pending to prevent false matches or other errors during migration. In some embodiments, the prior epoch may remain available for use during migration, but at least temporarily the hash computed using the new function may be stored alongside of the hash computed using the old function, or in some embodiments a metadata value indicating the hash function used to compute the currently-stored hash value for a chunk may be stored.

Figure 10:
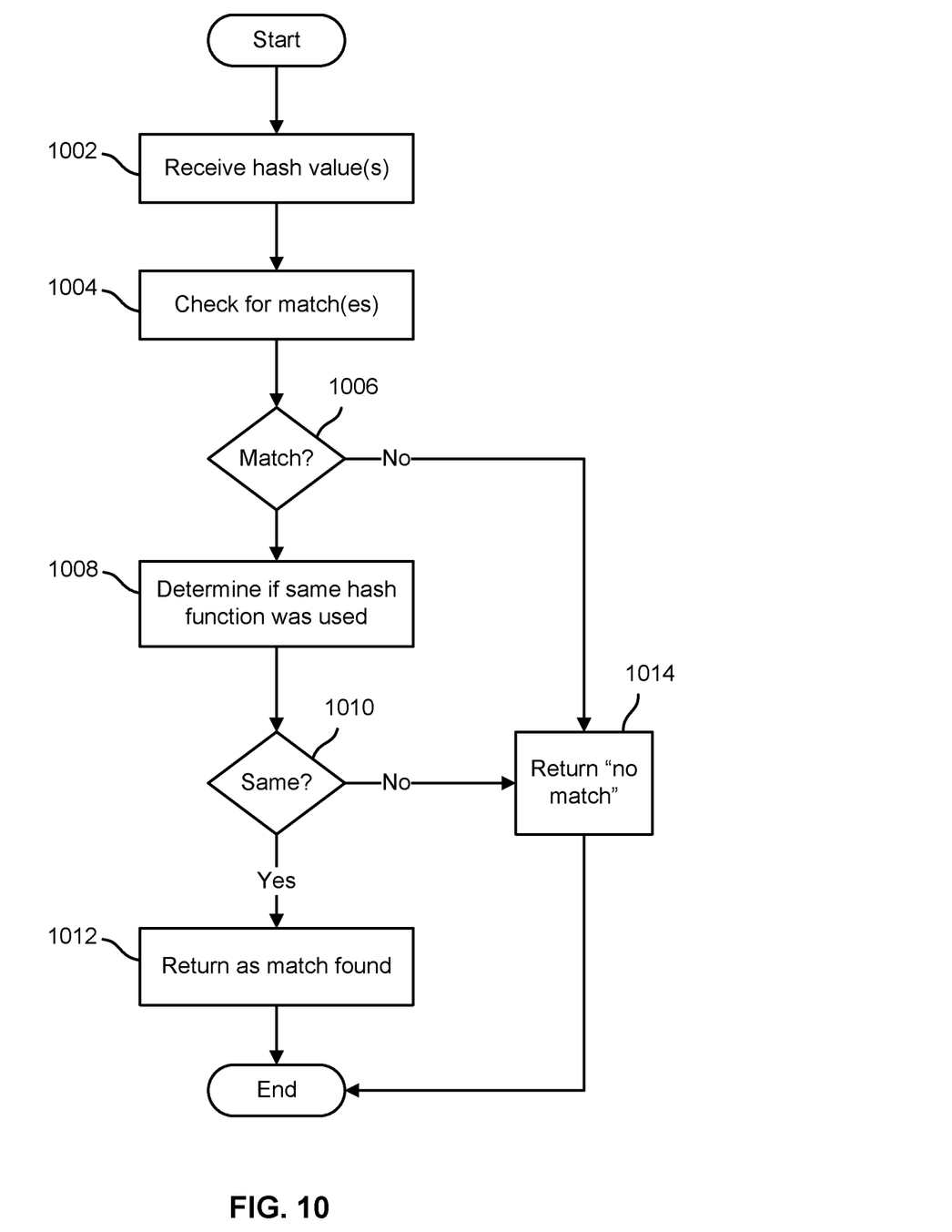
FIG. 10 is a flow chart illustrating an embodiment of a process to perform de-duplicated data storage using hash functions.

FIG. 10 is a flow chart illustrating an embodiment of a process to perform de-duplicated data storage using hash functions. In various embodiments, a file system metadata server, such as file system metadata server 110 of FIG. 1, may perform the process of FIG. 10. In the example shown, a set of hash values associated with a write request is received (1002). A check is performed to determine which, if any, of the received hash values are present already in the file system metadata (1004). For example, a query may be submitted, as in the example shown in FIG. 2. For each match found (1006), it is determined whether the hash function used to compute the previously stored instance of the hash value was the same as the hash function used to compute the received hash value that was matched (1008). In various embodiments, the foregoing check is performed because hash values stored to represent chunks of data stored in a prior epoch may have been computed using a different hash function than was used to compute a received hash value that was matched, such that presence of the same hash value (computed using a different function) does not indicate that the same data was stored previously. (Instead, different data that happened to result in a matching hash value computed using the different hash function may have been stored.) If the hash function used to compute a previously stored hash value that matched a received hash value is determined to be the same as the hash function used to compute the received hash value that was matched (1010), a result indicating that a match was found is returned (1012), and the corresponding chunk associated with the received hash value that was matched is treated as a duplicate of the previously stored chunk. For received hash values for which a match is not found (1006) or for which a match was found but it was determined that the previously stored hash value was computed using a different hash function than was used to compute the received hash value that was matched (1010), a result indicating that no match was found is returned (1014) and the corresponding chunk is treated as new data required to be stored in the cloud based data storage.

In various embodiments, techniques disclosed herein may be used to upgrade a de-duplicating distributed file system and/or other data management system to a new hash function, as needed, for example to adopt more modern or robust hash functions as older functions become weakened over time.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
storing, by one or more processors, a hash function epoch metadata to associate a hash function with an epoch, the epoch defining a subset of data stored by a distributed file system, wherein the hash function epoch metadata comprises a mapping of one or more identifiers corresponding to epochs to one or more identifiers corresponding to hash functions, wherein the mapping of the one or more identifiers corresponding to epochs to the one or more identifiers corresponding to hash functions comprises a table that comprises a first column corresponding to the one or more identifiers corresponding to epochs, and a second column corresponding to the one or more identifiers corresponding to hash functions, the second column storing a bitmask value that is indicative of the one or more hash functions associated with the corresponding epoch;
receiving, by one or more processors, a write request to write a chunk to the distributed file system; and
determining, by one or more processors, whether to store the chunk based at least in part on a hash function associated with the chunk corresponding to the write request and the mapping of the one or more identifiers corresponding to epochs to the one or more identifiers corresponding to hash functions.

2. The method of claim 1, wherein the hash function comprises a new hash function and further comprising receiving an indication to begin using the new hash function to manage storage of data associated with the distributed file system.

3. The method of claim 2, wherein the new hash function replaces an old hash function associated with a prior epoch.

4. The method of claim 2, wherein the new hash function is added to a set of currently supported hash functions which includes one or more previously used hash functions.

5. The method of claim 1, wherein the hash function epoch metadata identifies the hash function.

6. The method of claim 1, wherein the epoch is defined by reference to a content identifier of a data chunk associated with a boundary of the epoch.

7. The method of claim 6, wherein the boundary comprises a starting boundary.

8. The method of claim 6, wherein the content identifier comprises a unique identifier that is monotonically increased as new or revised data chunks are stored.

9. The method of claim 1, wherein the hash function epoch metadata includes a bitmask each of at least a subset of the bits of which corresponds to a corresponding hash function.

10. The method of claim 1, further comprising negotiating with a file system client to use the new hash function to perform a file system operation.

11. The method of claim 1, wherein the hash function comprises a new hash function and further comprising migrating data represented in the distributed file system in connection with hash values computed based at least in part on a prior hash function associated with a prior epoch to a new representation computed based at least in part on the new hash function.

12. The method of claim 11, further comprising updating hash function epoch metadata associated with the prior epoch to reflect migration to the new hash function.

13. The method of claim 12, wherein the updating the hash function epoch metadata comprises updating the mapping of the one or more identifiers corresponding to epochs to one or more identifiers corresponding to hash functions.

14. The method of claim 11, wherein the distributed file system is configured to:
determine that a received hash value matches a previously stored hash value; and use the hash function epoch metadata to determine whether the previously stored hash value was computed using the same hash function as the received hash value.

15. The method of claim 14, wherein the distributed file system is configured to conclude that a data chunk associated with the received hash value has already been stored by the distributed file system based at least in part on the determination that the received hash value matches the previously stored hash value and a determination that the previously stored hash value was computed based at least in part on the same hash function as the received hash value.

16. The method of claim 1, further comprising:
in response to receiving the write request, determining, by one or more processors, whether the distributed file system supports a hash function associated with the chunk corresponding to the write request, the write request being received from a client terminal;
in response to determining that the distributed file system supports the hash function associated with the chunk, storing the chunk; and
in response to determining that the distributed file system does not support the hash function, providing to the client terminal an indication that the hash function associated with the chunk is not supported.

17. The method of claim 15, further comprising:
providing, by one or more processors, an indication of one or more hash functions supported by the distributed file system, the indication being provided to the client terminal in connection with the indication that the hash function associated with the chunk is not supported.

18. The method of claim 1, wherein the determining whether to store the chunk comprises determining whether to store the chunk based at least in part on (i) the hash function associated with the chunk, and (ii) the hash function epoch metadata.

19. The method of claim 1, further comprising:
configuring, by one or more processors, the distributed file system to use the hash function epoch metadata to manage storage of data comprising the subset of data stored by the distributed file system.

20. A system, comprising:
a memory or other storage device; and
a processor coupled to the memory or other storage device and configured to:
store in the memory or other storage device a hash function epoch metadata to associate a hash function with an epoch, the epoch defining a subset of data stored by a distributed file system, wherein the hash function epoch metadata comprises a mapping of one or more identifiers corresponding to epochs to one or more identifiers corresponding to hash functions, wherein the mapping of the one or more identifiers corresponding to epochs to the one or more identifiers corresponding to hash functions comprises a table that comprises a first column corresponding to the one or more identifiers corresponding to epochs, and a second column corresponding to the one or more identifiers corresponding to hash functions, the second column storing a bitmask value that is indicative of the one or more hash functions associated with the corresponding epoch;
receive a write request to write a chunk to the distributed file system; and
determine whether to store the chunk based at least in part on a hash function associated with the chunk corresponding to the write request and the mapping of the one or more identifiers corresponding to epochs to the one or more identifiers corresponding to hash functions.

21. A computer program product, the computer program product being embodied in a non-transitory computer readable storage medium and comprising computer instructions for:
storing a hash function epoch metadata to associate a hash function epoch metadata to associate a hash function with an epoch, the epoch defining a subset of data stored by a distributed file system, wherein the hash function epoch metadata comprises a mapping of one or more identifiers corresponding to epochs to one or more identifiers corresponding to hash functions, wherein the mapping of the one or more identifiers corresponding to epochs to the one or more identifiers corresponding to hash functions comprises a table that comprises a first column corresponding to the one or more identifiers corresponding to epochs, and a second column corresponding to the one or more identifiers corresponding to hash functions, the second column storing a bitmask value that is indicative of the one or more hash functions associated with the corresponding epoch;
receiving, by one or more processors, a write request to write a chunk to the distributed file system; and
determining, by one or more processors, whether to store the chunk based at least in part on a hash function associated with the chunk corresponding to the write request and the mapping of the one or more identifiers corresponding to epochs to the one or more identifiers corresponding to hash functions.

* * * * *